(12) United States Patent
Jory et al.

(10) Patent No.: US 11,906,684 B2
(45) Date of Patent: Feb. 20, 2024

(54) UNDERGROUND ASSET MARKER WITH RADIO INTERROGATION

(71) Applicant: Berntsen International, Inc., Madison, WI (US)

(72) Inventors: Edward Jory, Madison, AL (US); Michael Klonsinski, Belleville, WI (US); Jason Amos, Albertville, AL (US)

(*) Notice: Subject to any disclaimer, the term of this patent is extended or adjusted under 35 U.S.C. 154(b) by 178 days.

(21) Appl. No.: 17/336,732

(22) Filed: Jun. 2, 2021

(65) Prior Publication Data

US 2021/0373197 A1 Dec. 2, 2021

Related U.S. Application Data

(60) Provisional application No. 63/033,289, filed on Jun. 2, 2020.

(51) Int. Cl.
| | |
|---|---|
| *G01V 15/00* | (2006.01) |
| *E04H 12/22* | (2006.01) |
| *G06K 19/077* | (2006.01) |

(52) U.S. Cl.
CPC ........... *G01V 15/00* (2013.01); *E04H 12/22* (2013.01); *G06K 19/07758* (2013.01)

(58) Field of Classification Search
CPC .... G08B 13/14; G08B 13/24; G08B 13/2417; G08B 13/2477; G01C 15/00; G01C 15/04; G01V 15/00; G06K 19/04; G06K 19/077; G06K 19/07758; E04H 12/22; E04H 12/2215; A01K 7/00; A01K 7/06; A47F 5/00; A47F 5/02; H04W 4/80

See application file for complete search history.

(56) References Cited

U.S. PATENT DOCUMENTS

| | | | | |
|---|---|---|---|---|
| 4,779,955 | A * | 10/1988 | Schmanski | E01F 9/619 |
| | | | | 248/156 |
| 6,631,886 | B1 * | 10/2003 | Caudle | B66D 1/00 |
| | | | | 254/338 |
| 8,947,205 | B2 | 2/2015 | Rushing | |
| 11,452,280 | B2 * | 9/2022 | Bratu | A01K 7/06 |
| 2001/0010367 | A1 * | 8/2001 | Burnell-Jones | C09K 11/02 |
| | | | | 252/301.36 |
| 2008/0284600 | A1 * | 11/2008 | Drzaic | G01S 13/75 |
| | | | | 340/572.1 |

* cited by examiner

*Primary Examiner* — Van T Trieu
(74) *Attorney, Agent, or Firm* — Boyle Fredrickson, SC

(57) ABSTRACT

A carrier for installing an RFID tag in a utility marker tube provides a centering plate fitting against an upper edge of the tube and oriented and positioned either by inner tube walls and/or the outer tube wall periphery to locate a downwardly extending transducer support tab holding the transducer within the tube. The centering plate may be held in place by a separate or integrated cap retaining the centering plate while sealing the tube against environmental contamination.

10 Claims, 3 Drawing Sheets

UNDERGROUND ASSET MARKER WITH RADIO INTERROGATION

CROSS REFERENCE TO RELATED APPLICATION

This application claims the benefit of U.S. provisional application 63/033,289 filed Jun. 2, 2020, and hereby incorporated by reference.

BACKGROUND OF THE INVENTION

The present invention relates to markers for underground assets such as pipelines, fiber optic cables, and the like, and in particular to an above-ground asset marker providing radio interrogation.

It is known to mark underground assets, for example, by using marker posts extending upward from the ground and placed in a line-of-sight fashion aligned with the underground course of the utility. A cylindrical tube is often used for the marker post because it is equally visible from multiple directions and provides good rigidity and resistance to warpage. Such marker post structures can be given different colors and labels, for example, identifying a type of pipeline (e.g., natural gas), providing a written warning, and identifying the company operating the pipeline.

U.S. Pat. No. 8,947,205, entitled "System, Method and Monument for Land Surveying" and assigned to the assignee of the present application, describes a marker post that may incorporate a magnet and RFID tag, the latter permitting radio interrogation of a local electronic memory embedded within the posts. Such radio interrogation allows automatic data entry during inventory, survey, or inspection operations and permits the recording of information in the marker post that cannot readily be contained in a decal or is not desirably visible to the public. Having a point of local data storage can also permit the logging of information in the marker post, for example, inspection frequency, and allows communication with the remote computer providing an additional information link to a unique serial number in the tag.

SUMMARY OF THE INVENTION

The present invention provides a carrier for supporting an RFID tag in a marker post having a centering plate supporting a downwardly extending tab holding the RFID tag. The centering plate automatically orients and positions the RFID tag properly within the post and can be retained against the upper edge of the post by a cap fitting over the post or incorporated into centering plate itself. The post and carrier are constructed of a radio-transparent thermoplastic material to eliminate the need for slots or other breaches in the integrity of the post.

Specifically, then, the present invention provides an RFID marker system having a tubular post of a radio-transparent polymer material adapted for partial insertion in the ground to extend upward therefrom. A centering plate fits against an upper end of the tubular post to be supported by the upper end within a periphery of an outer wall of the tubular post. A transponder support tab is attached to and extends downwardly from the centering plate within the tubular post to present a planar, vertically extending surface sized to receive an RFID tag attached to the vertical planar surface.

It is thus a feature of at least one embodiment of the invention to provide a readily manufactured marker post that can incorporate RFID capabilities. The single piece carrier can be quickly installed in current marker post designs either at the time of manufacture or in a retrofit capacity with minimal additional manufacturing steps.

The marker system may further include a cap having an upper wall having at its perimeter downwardly extending walls adapted to slidably receive the outer walls of the tubular post of the upper end of the tubular post to capture the centering plate between a lower surface of the upper wall of the cap and an upper surface of the upper end of the tubular post.

It is thus a feature of at least one embodiment of the invention to allow an RFID tag to be attached to a conventional marker post during the process of attaching the cap, eliminating the need for ancillary manufacturing steps.

The centering plate may provide a periphery slidably received against an inner surface of the downwardly extending walls of the cap to locate the centering plate within the tubular post.

It is thus a feature of at least one embodiment of the invention to allow an inter-fitting between edges of the centering plate and the inner surfaces of cap to automatically align and register the carrier without the need for separate positioning.

Alternatively or in addition, the centering plate may provide a peripheral flange overlying an upper surface of the upper end of the tubular post and a rim extending downwardly from the centering plate inside an outer edge of the peripheral flange to be slidably received against inner walls of the upper end of the tubular post to locate the centering plate with respect to the tubular post walls.

It is thus a feature of another embodiment of the invention to allow the centering plate to be located with respect to the upper end of the tube before installation of the cap to eliminate possible interference in that installation.

In one embodiment, the carrier plate may have at its perimeter downwardly extending walls adapted to slidably receive the outer walls of the tubular post periphery of the outer wall of the upper end of the tubular post.

It is thus a feature of at least one embodiment of the invention to integrally form the carrier and the cap to further reduce manufacturing steps.

The post may have a noncircular cross-section and the centering plate may be keyed to the cross-section to position the RFID tag along a predetermined orientation about a central axis of the post.

It is thus a feature of at least one embodiment of the invention to enforce a predetermined registration between the RFID tag and the outer surfaces of the post to provide a predictable RFID reception pattern.

The post and centering plate maybe substantially triangular.

It is thus a feature of at least one embodiment of the invention to provide a post that readily accommodates a registration with the RFID tag.

The post may include outer fiducial markings positioned with respect to the predetermined orientation to indicate an axis of sensitivity of the internal RFID tag.

It is thus a feature of at least one embodiment of the invention to clearly indicate to users of the post the proper orientation of an RFID tag reader for maximum sensitivity to improve efficiency of data logging tasks.

The centering plate and transponder support tab may be integrally molded of a thermoplastic material.

It is thus a feature of at least one embodiment of the invention to provide a readily manufactured RFID carrier that is radio-transparent to improve RFID reader sensitivity.

These particular objects and advantages may apply to only some embodiments falling within the claims and thus do not define the scope of the invention.

DETAILED DESCRIPTION OF THE PREFERRED EMBODIMENT

Figure 2:
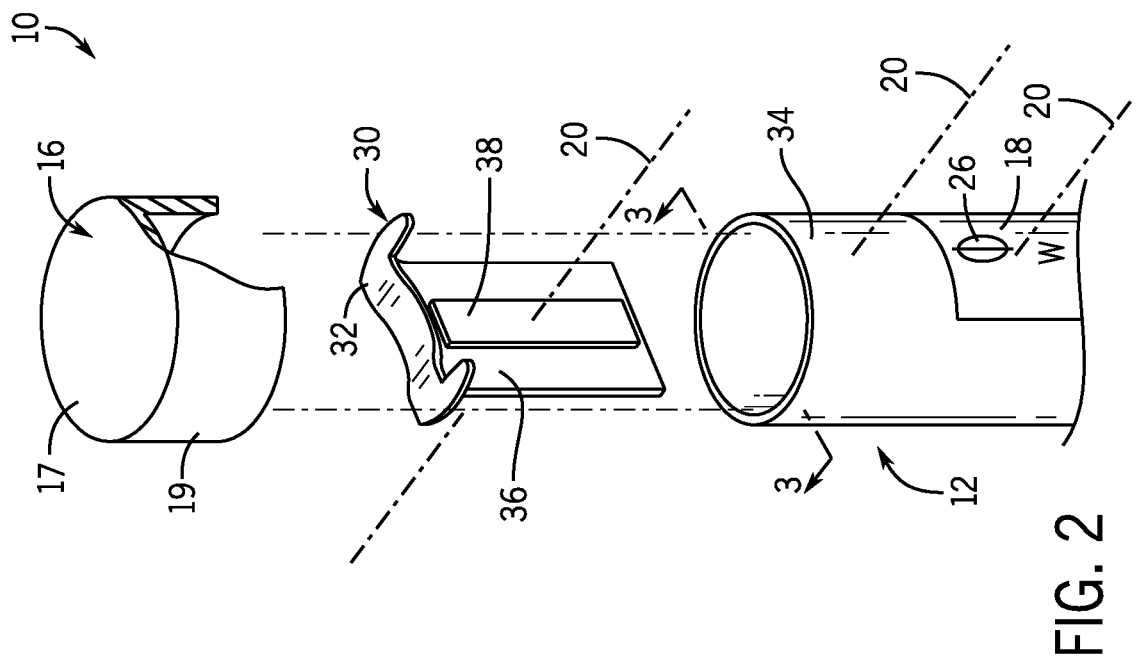
FIG. 2 is an exploded view of the upper end of the marker post showing a transponder carrier fitting within the marker post.
Figure 1:
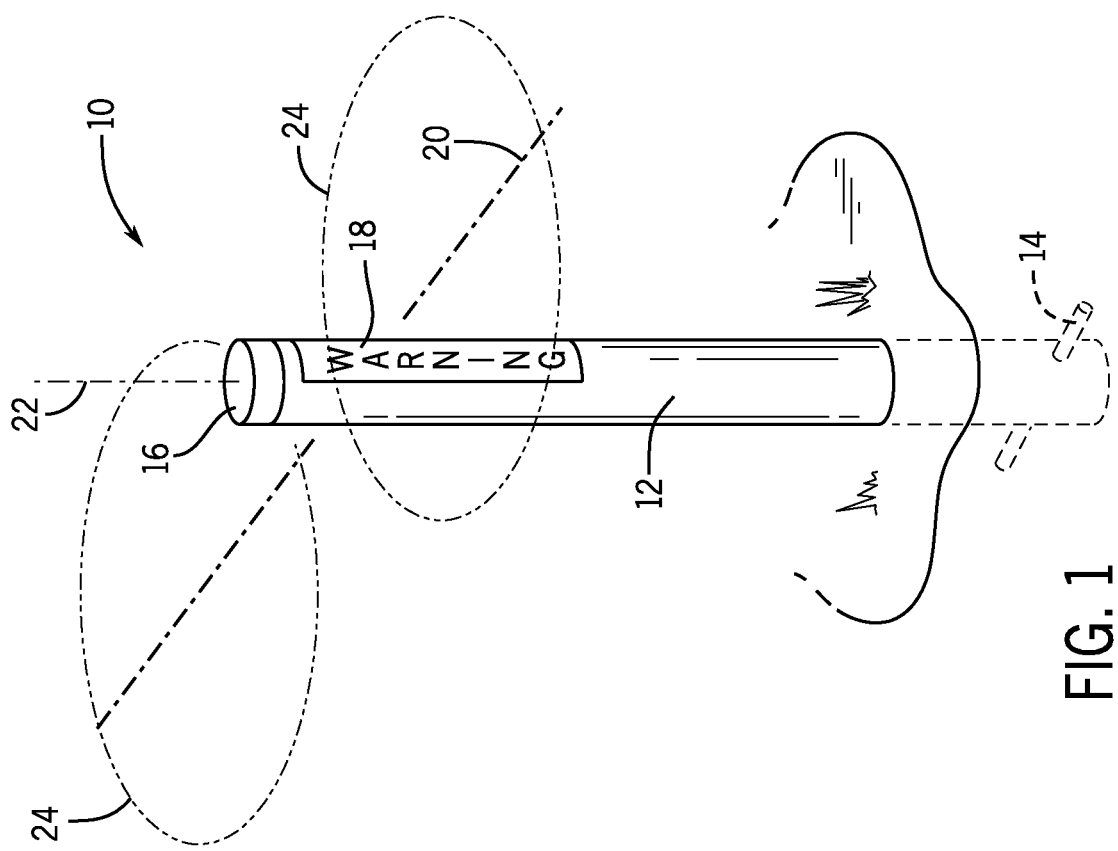
FIG. 1 is a perspective view of a marker post constructed according to the present invention showing antenna reception patterns aligned with a post markings.

Referring now to FIGS. 1 and 2, a marker post 10, for example, suitable for use in marking pipelines or the like may provide for a generally upstanding cylindrical tube 12 having, in one example, a 3.5" outside diameter and constructed, in one example, of polypropylene or a fiberglass composite or other electrically nonconductive, radio transmissive material eliminating faraday cage effects. Typically, the post 10 will have a length from 72 to 96 inches to provide a portion that may be buried underground and which may include a T anchor 14 passing perpendicularly through a lower end of the post 10 to extend into the surrounding earth to help resist extraction or rotation.

The upper end of the cylindrical tube 12 may be capped, for example, with a press-fit polymer cap 16 having an upper circular wall 17 having a dimension equal to the outside dimension of the cylindrical tube 12 and peripheral downwardly extending rim walls 19 fitting tightly against the outer diameter of the cylindrical body of the cylindrical tube 12. A decal 18 or other labeling may be placed on a front side of the vertical wall of the cylindrical tube 12 near its upper end, for example, providing a warning that there is a buried utility line beneath the marker post 10 and establishing an axis 20 about a post vertical 22 along which antenna reception patterns 24 may be aligned. In this regard, a center of the decal 18 or a fiducial mark 26 on the decal 18 may be along a line of radius of the cylindrical tube 12 aligned with the axis 20.

A cylindrical tube 12 and cap 16 suitable for use with the present invention is commercially available under the trade name of VisiPost™ Carsonite of Newberry, South Carolina, United States.

Referring again to FIG. 2, as noted, the decal 18 may include a fiducial mark 26 indicating the axis 20 and providing an indication of the proper orientation and location of an RFID tag reader along the axis 20 facing the decal 18 or 180° from that position also along the axis 20.

Figure 3:
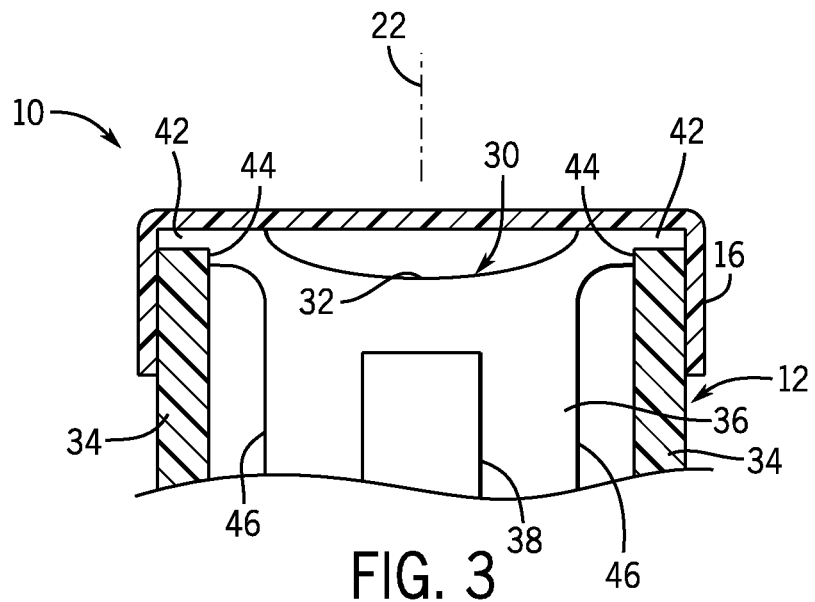
FIG. 3 is a fragmentary elevational cross-section along line 3-3 of FIG. 2 showing positioning of the transponder carrier within a tubular body of the marker post.

The upper end of the post 10 may provide for a transponder carrier 30 fitting between the cap 16 and an upper lip of the cylindrical tube 12. Referring also to FIG. 3, the transponder carrier 30 may include a horizontal centering plate 32 extending by a diameter of the cylindrical tube 12 between outer surfaces of opposed sidewalls 34 of the cylindrical tube 12. The transponder carrier 30 may include a downwardly pendant transponder support tab 36 attached to the underside of the centering plate 32 and providing a vertically extending planar surface supporting an RFID tag 38 spaced from the sidewalls 34. Preferably the transponder carrier 30 is constructed of an electrically insulating material such as an injection-molded thermoplastic that is substantially radiofrequency transparent as a result of the material selection thickness of the downwardly extending tab 36. An RFID tag 38 suitable for use with the present invention is commercially available under the trade name ALN-9610 Squig Higgs® 3 RFID tag available from Alien Technology of San Jose, California.

Figure 4:
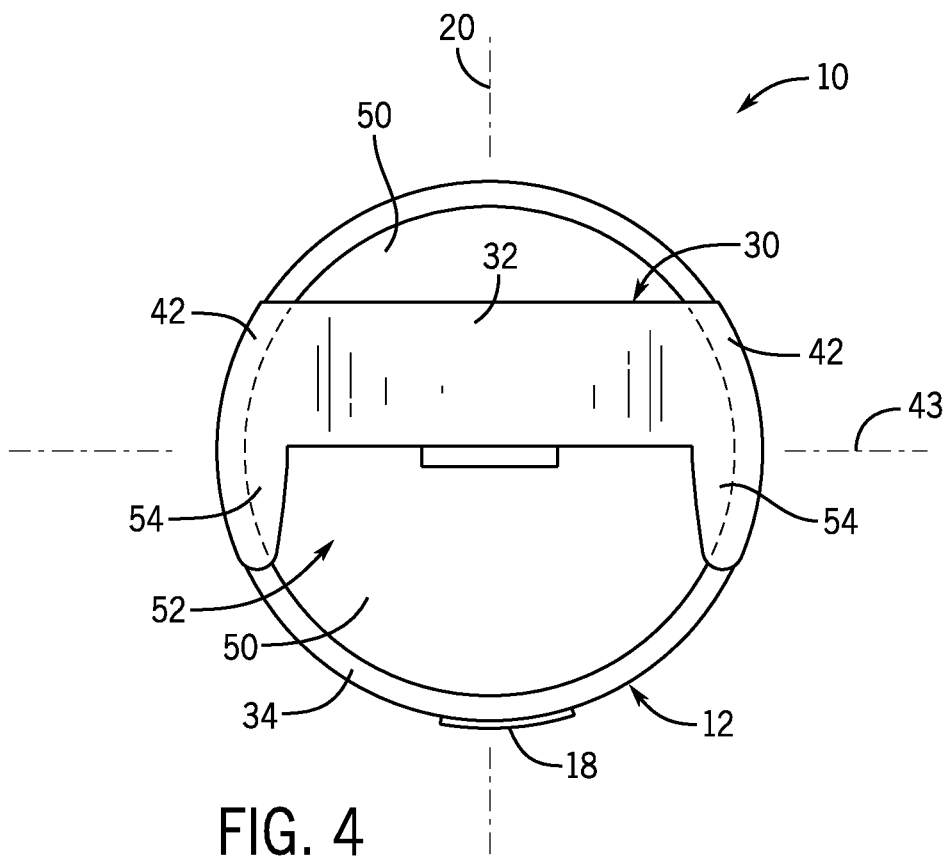
FIG. 4 is a top plan view of the transponder carrier fitted on the tubular body of the marker post.

Referring now also to FIGS. 3 and 4, the centering plate 32 may provide an outwardly horizontally extending peripheral flange 42 having an outer periphery following the outside perimeter of the sidewalls 34 of the upper edge of the cylindrical tube 12. A portion of the flange overlying the upper edge of the cylindrical tube 12 may be captured between the lower surface of the cap 16 and an upper rim of the cylindrical tube 12. As such, this portion is resistant to damage from downward forces on the cap 16 as supported by the surface of the upper edge of the sidewalls 34. A rim 44 of the centering plate 32 extends downwardly along the inner surface of the inner diameter of the cylindrical tube 12 to center the centering plate 32 within the cylindrical tube 12 so that the downwardly extending tab 36 has its broad face aligned generally along a diameter 43 of the cylindrical tube 12 so that the RFID tag 38 is centered therein.

The upper surface of the centering plate 32 between the flanges 42 may be recessed downwardly beneath the cap 16 so as to prevent damage by slight downward flexure of the cap 16 from a striking of the upper surface of the marker post 10. In addition, as positioned within the cylindrical tube 12, the left and right vertical edges 46 of the tab 36 of the transponder carrier 30 are spaced away from the inner diameter of the cylindrical tube 12 to further provide a degree of shock isolation between the cylindrical tube 12 and the transponder carrier 30.

Referring to FIG. 4, during installation, the transponder carrier 30 will be oriented such that the RFID tag 38 and a broad plane of the tab 36 of the transponder carrier 30 are perpendicular to the axis 20 so as to provide the antenna reception patterns 24 shown in FIG. 1 extending along axis 20 forwardly and rearwardly from the marker post 10.

As noted, the centering plate 32 may extend horizontally along the diameter 43 by the full extent of the outside diameter of the cylindrical tube 12 but along the axis 20 perpendicular to that diameter 43 by approximately one half of the outside diameter of the cylindrical tube 12 to provide for openings 50 between the centering plate 32 and the inner surface of the sidewalls 34 that may receive a user's fingers for installation or removal of the transponder carrier 30. A portion of the centering plate 32 extending from the diameter 43 horizontally outward on the side of the RFID tag 38 may include a cut out 52 allowing inspection of the RFID tag 38 from a vertical orientation and defining left and right bridge fingers 54 that may provide slight inward flex to accommodate slight out-of-round conditions of the cylindrical tube 12 while providing a snug engagement of the two.

Figure 5:
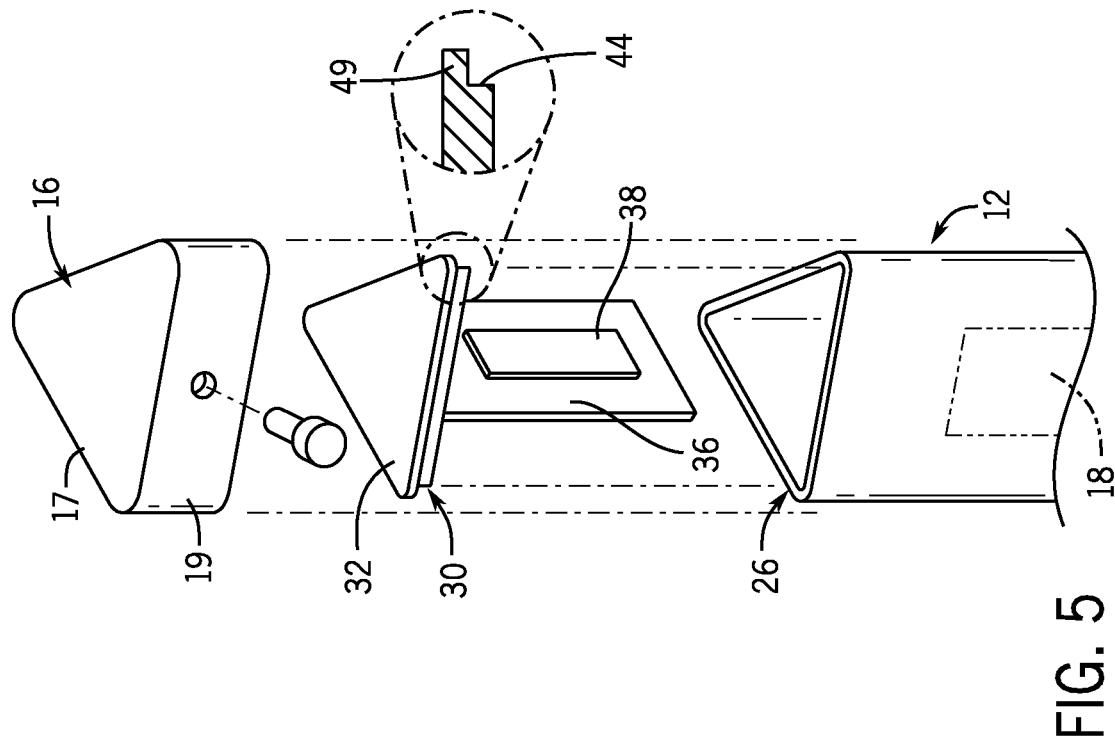
FIG. 5 is a figure similar to that of FIG. 2 showing a carrier adapted for a triangular post.

Referring now to FIG. 5, in an alternative embodiment, the tube 12 may have a triangular cross section with the downwardly extending rim 44 of the carrier 30 following a triangular periphery to be slidably received along the inner walls of the tube 12 and a horizontal outwardly extending flange 42 following a periphery of the outer walls of the tube 12. In this case the cap 16 may also have a triangular upper wall 17 so that downwardly extending walls 19 slidably conform to the outer surface of the tube 12 and help to center the carrier 30. As before, a transponder support tab 36 extends downwardly from the centering plate 32 to hold an RFID tag 38.

Figure 6:
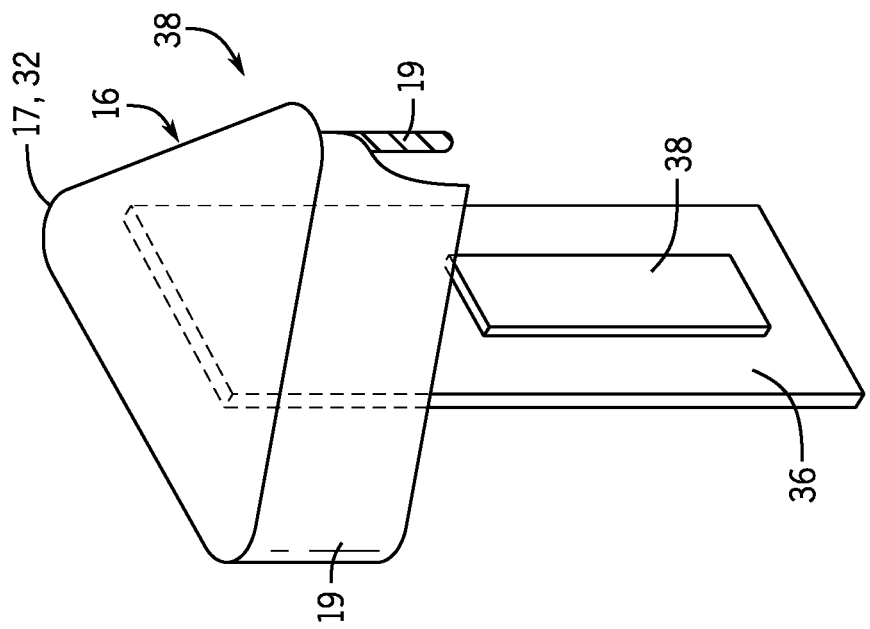
FIG. 6 is an alternative configuration of the carrier of FIG. 5 incorporated into a cap as a single integrated element.

Referring now to FIG. 6, it will be appreciated that the centering plate 32 may be integrally formed with the upper wall 17 to provide a one-piece system incorporating both the carrier 30 and the cap 16.

Referring now to FIG. 6, in an alternative embodiment, the centering plate 32 in an upper wall of 17 may be integrally formed, for example, by injection molding to eliminate a separate cap 16 and to simplify assembly of the carrier 30 to the tube 12 (shown in FIG. 5).

Certain terminology is used herein for purposes of reference only, and thus is not intended to be limiting. For example, terms such as "upper", "lower", "above", and "below" refer to directions in the drawings to which reference is made. Terms such as "front", "back", "rear", "bottom" and "side", describe the orientation of portions of the component within a consistent but arbitrary frame of reference which is made clear by reference to the text and the associated drawings describing the component under discussion. Such terminology may include the words specifically mentioned above, derivatives thereof, and words of similar import. Similarly, the terms "first", "second" and other such numerical terms referring to structures do not imply a sequence or order unless clearly indicated by the context.

When introducing elements or features of the present disclosure and the exemplary embodiments, the articles "a", "an", "the" and "said" are intended to mean that there are one or more of such elements or features. The terms "comprising", "including" and "having" are intended to be inclusive and mean that there may be additional elements or features other than those specifically noted. It is further to be understood that the method steps, processes, and operations described herein are not to be construed as necessarily requiring their performance in the particular order discussed or illustrated, unless specifically identified as an order of performance. It is also to be understood that additional or alternative steps may be employed.

It is specifically intended that the present invention not be limited to the embodiments and illustrations contained herein and the claims should be understood to include modified forms of those embodiments including portions of the embodiments and combinations of elements of different embodiments as come within the scope of the following claims. All of the publications described herein, including patents and non-patent publications, are hereby incorporated herein by reference in their entireties To aid the Patent Office and any readers of any patent issued on this application in interpreting the claims appended hereto, applicants wish to note that they do not intend any of the appended claims or claim elements to invoke 35 U.S.C. 112(f) unless the words "means for" or "step for" are explicitly used in the particular claim.

What we claim is:

1. An RFID marker system comprising:
   a tubular post of a radio-transparent polymer material adapted for partial insertion in the ground to extend upward therefrom, the tubular post providing outer walls defining an internal volume;
   a centering plate receivable at an upper end of the tubular post to be supported by the upper end of the tubular post;
   a transponder support tab attached to and extending downwardly from the centering plate when the centering plate is received at an upper end of the tubular post, the transponder support tab extending within the internal volume to present a vertically extending surface sized to receive an RFID tag thereupon; and
   an RFID tag attached to the vertically extending surface; and
   further including a cap having an upper wall and having at its perimeter downwardly extending walls adapted to slide over the outer walls of the tubular post of the upper end of the tubular post therein to capture the centering plate between a lower surface of the upper wall of the cap and an upper surface of the upper end of the tubular post.

2. The RFID marker system of-claim 1 wherein the centering plate provides a periphery slidably received against an inner surface of the downwardly extending walls to locate the centering plate within the tubular post.

3. The RFID marker system of claim 1 wherein the centering plate provides a peripheral flange overlying an upper surface of the upper end of the tubular post and a rim extending downwardly from the centering plate inside an outer edge of the peripheral flange to be slidably received against inner walls of the upper end of the tubular post to locate the centering plate with respect to the tubular post walls.

4. The RFID marker system of claim 1 wherein the centering plate has at its perimeter downwardly extending walls adapted to slidably receive the outer walls of the tubular post.

5. The RFID marker system of claim 1 wherein the post has a noncircular cross-section and the centering plate is keyed to the cross-section to position the RFID tag along a predetermined orientation about a central axis of the post.

6. The RFID marker system of claim 5 wherein the post and centering plate are substantially triangular.

7. The RFID marker system of claim 5 wherein the post includes outer fiducial markings positioned with respect to the predetermined orientation to indicate an axis of sensitivity of the RFID tag.

8. The RFID marker system of claim 1 wherein a lower end of the post includes at least one anchor extending outwardly from the post to resist removal of the post.

9. The RFID marker system of claim 1 wherein the centering plate and transponder support tab are integrally molded of a thermoplastic material.

10. The RFID marker system of claim 1 wherein the post is constructed from a polymer material selected from the group consisting of a fiberglass, thermoset plastic, and a thermoplastic.

* * * * *